(12) United States Patent
Moshchuk et al.

(10) Patent No.: US 8,098,174 B2
(45) Date of Patent: Jan. 17, 2012

(54) FEASIBLE REGION DETERMINATION FOR AUTONOMOUS PARKING

(75) Inventors: Nikolai K. Moshchuk, Grosse Pointe, MI (US); Shih-Ken Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 384 days.

(21) Appl. No.: 12/427,929

(22) Filed: Apr. 22, 2009

(65) Prior Publication Data

US 2010/0271236 A1 Oct. 28, 2010

(51) Int. Cl.
*B60Q 1/48* (2006.01)

(52) U.S. Cl. .................. 340/932.2; 340/425.5; 340/435; 340/436; 340/933; 340/938; 701/48; 701/49; 701/50; 701/51; 701/52; 348/148

(58) Field of Classification Search .......... 340/932–933, 340/425.5, 435, 436, 932–93; 701/48–59; 348/148
See application file for complete search history.

(56) References Cited

U.S. PATENT DOCUMENTS

| | | | |
|---|---|---|---|
| 6,097,314 A | 8/2000 | Desens et al. | |
| 6,265,968 B1 | 7/2001 | Betzitza et al. | |
| 6,943,726 B2 | 9/2005 | Schneider | |
| 6,948,729 B2 | 9/2005 | Zalila et al. | |
| 2006/0139181 A1 | 6/2006 | Danz et al. | |
| 2007/0075875 A1 | 4/2007 | Danz et al. | |
| 2009/0085771 A1* | 4/2009 | Wu et al. | 340/932.2 |
| 2010/0283632 A1* | 11/2010 | Kawabata et al. | 340/932.2 |

FOREIGN PATENT DOCUMENTS

| | | |
|---|---|---|
| DE | 29718862 U1 | 12/1997 |
| DE | 19809416 A1 | 9/1999 |
| EP | 0783114 A1 | 7/1997 |
| EP | 1533181 A2 | 5/2005 |
| WO | WO2007033806 A1 | 3/2007 |

\* cited by examiner

*Primary Examiner* — George Bugg
*Assistant Examiner* — Ojiako Nwugo

(57) ABSTRACT

A method is provided for initiating a parking maneuver for parallel parking a vehicle between a first object and a second object. A target parking space is measured. A determination is made whether the measured target parking space is sufficient to allow an autonomous parallel parking maneuver. A region of feasible starting locations is determined to successfully perform the parallel parking maneuver between the first object and the second object if the available parking space is sufficient. A position of a midpoint of a rear axle is determined in relation to the designated region. A determination is made whether the midpoint of the rear axle is within the designated region. A driver of the vehicle is signaled in response to an instantaneous location of the midpoint of the rear axle vehicle being a feasible starting location to initiate the parallel parking maneuver.

19 Claims, 5 Drawing Sheets

FEASIBLE REGION DETERMINATION FOR AUTONOMOUS PARKING

BACKGROUND OF INVENTION

An embodiment relates generally to parallel parking of a vehicle.

Parallel parking a vehicle between two vehicles is often a difficult task for a driver. Semi-autonomous parking systems aid the driver in performing difficult parking maneuvers such as parallel parking. Such systems either guide the driver in steering the vehicle through its intended trajectory path or increase/decrease power steering efforts when the driver of the vehicle has deviated from the intended trajectory path. In such systems, an intended trajectory path is determined based on the available space between a pair of objects. However, such paths are often determined for a predetermined point where the vehicle must be located to initiate the parking maneuver. That is, the intended trajectory path may be determined for a position other than where the vehicle is actually located. As a result, based on the location and/or orientation of the vehicle, the determined intended trajectory path may not be suitable for parallel parking the vehicle based on the vehicle's current location/orientation.

SUMMARY OF INVENTION

An advantage of an embodiment is a determination of whether a vehicle can initiate a planned path parking routine from a current vehicle position. A designated region is determined based on the planned parking path prior to the vehicle initiating the parallel parking routine. Respective designated regions are determined based on whether a one cycle parking strategy or a two cycle parking strategy is utilized in addition to the orientation of the vehicle at its initial starting position.

An embodiment contemplates a method of initiating a parking maneuver for parallel parking a vehicle between a first object and a second object. A target parking space is measured. A determination is made whether the measured target parking space is sufficient to allow an autonomous parallel parking maneuver. A region of feasible starting locations is determined to successfully perform the parallel parking maneuver between the first object and the second object if the available parking space is sufficient. A position of a midpoint of a rear axle is determined in relation to the designated region. A determination is made whether the midpoint of the rear axle is within the designated region. A driver of the vehicle is signaled in response to an instantaneous location of the midpoint of the rear axle vehicle being a feasible starting location to initiate the parallel parking maneuver.

An embodiment contemplates a method for initiating a parking maneuver for parallel parking a vehicle between a first object and a second object. An available parking space is identified for parking the vehicle between the first object and the second object. A determination is made whether the available parking space is sufficient to successfully perform a parallel parking maneuver in response to a width of the vehicle, a length of the available parking space, a rear axle midpoint-to-bumper length, and vehicle turning radius. A designated region to initiate a successful parallel parking maneuver is determined. A position of the midpoint of the rear axle of the vehicle in relation to the designated region is determined. A determination is made whether the midpoint of the rear axle is within the designated region. A parallel parking maneuver is performed for parking the vehicle in the available parking space in response to the midpoint of the rear axle being within the respective region.

An embodiment contemplates an autonomous parking system for parallel parking a vehicle between a first object and a second object. The autonomous parking system identifying a feasible region in a road adjacent the second object for initiating an autonomous parallel parking maneuver. A sensing device detects objects proximate to the driven vehicle. The sensing device provides signals configured for determining a space between the first object and the second object. A controller receives the signals identifying the space between the first object and the second object. The controller determines whether the vehicle can be autonomously parked utilizing a one cycle parking strategy or a two cycle parking strategy. The controller determines the respective region in relation to the second object to initiate an autonomous parallel parking maneuver between the first and second objects. The controller further identifies whether the vehicle is within the respective region. The controller actuates a command to initiate the autonomous parallel parking maneuver in response to the vehicle being within the respective region.

DETAILED DESCRIPTION

Figure 1:
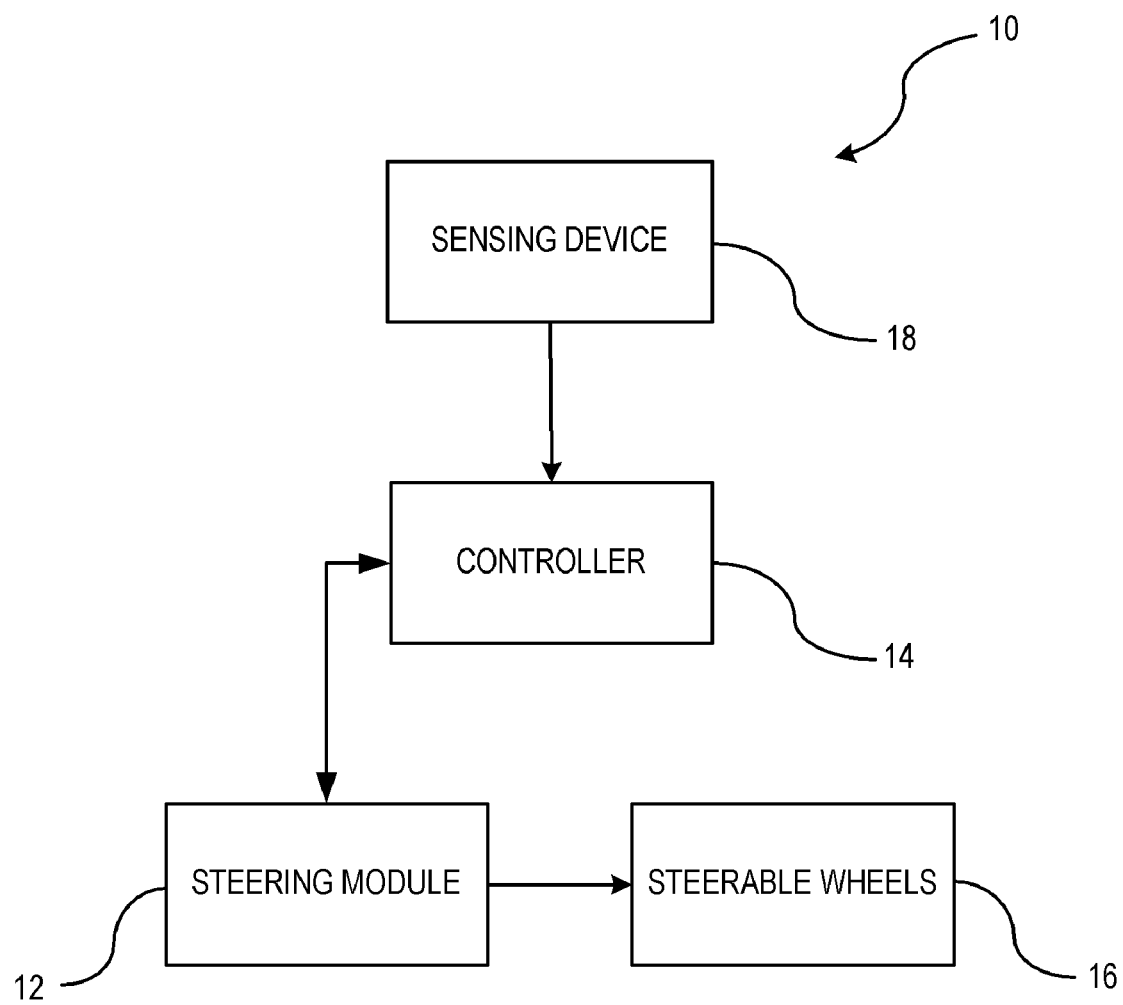
FIG. 1 is a block diagram illustrating an autonomous parallel parking system according to an embodiment.

There is shown in FIG. 1 an embodiment of an autonomous steering system 10 for parallel parking a vehicle. The autonomous steering system 10 includes a steering module 12 and a controller 14 for controlling steerable wheels 16 of the vehicle. The steering module 12 may be an electronic module or similar device that is capable of turning the steerable wheels 16 without a driver's steering demand via a steering wheel of the vehicle. The controller 14 provides control input signals to the steering module 12, such as a conventional electronic power steering module, for controlling the turning of the steerable wheels during a parking maneuver. The controller 14 may be separate from the steering module 12 or may be integrated within the steering module 12 as a single unit.

The autonomous steering system 10 further includes a sensing device 18 for detecting objects proximate to the driven vehicle. The sensing device 18 detects the presence and non-presence of objects laterally from the vehicle for determining target parking space between a first object and a second object. The sensing device 18 may include a radar-based sensing device, an ultrasonic-based sensing device, an imaging-based sensing device, or similar device capable of providing a signal characterizing the available space between the objects. The sensing device 18 is in communication with the controller 14 for providing signals to the controller 14. The sensing device 18 may be capable of determining the distance between the respective objects and communicating the determined distance to the controller 14, or the sensing device 18 may provide signals to the controller 14 to be used by the controller 14 to determine the distance of the spacing between the objects.

In response to the determined spacing between the first and second objects, controller 14 determines whether to apply a one cycle parking strategy or a two cycle parking strategy. The one cycle parking strategy pivots the steerable wheels in a first direction and then pivots the steerable wheels in a counter direction while maneuvering the vehicle in a reverse direction to a final park position. No gear change is required in a one cycle parking strategy.

In the two cycle parking strategy, the steerable wheels are pivoted in a first turning direction and then pivoted in a counter turning direction while moving the vehicle in a reverse (backup) direction (i.e., first steering cycle). Thereafter, a gear change is performed (i.e., placing the transmission in a forward position) and a second steering cycle is performed for moving the vehicle forward to a final park position. Determining whether the vehicle can be successfully parallel parked utilizing the two cycle steering strategy is modeled on a condition of whether the vehicle parked in the available parking space can leave the parking spot utilizing two steering cycles. That is, if the vehicle can leave the parking space utilizing only two steering cycles, then the vehicle can be parallel parked in the parking space utilizing the two cycle parking strategy. The first steering cycle includes the vehicle moving backward in the available parking space at respective turning angles until a respective rear corner of the vehicle reaches a respective boundary (i.e., front of the first object). The second steering cycle includes the vehicle moving forward until a respective front corner of the vehicle reaches a respective rear boundary of the second object (i.e., rear corner of the second object).

A routine for determining whether a vehicle can be parked in an available parking space utilizing either a single cycle parking strategy or a two cycle parking strategy is described in a co-pending application having a Ser. No. 12/107,130, filed on Apr. 22, 2008, which is incorporated by reference in its entirety. The routine determines a first minimum length for parking the vehicle using a one cycle parallel parking strategy and a second minimum length for parking the vehicle using a two cycle parallel parking strategy based on the available parking space between the first object and second object. Another routine for determining a path planning trajectory for parallel parking the vehicle based on the available parking space utilizing either a one cycle parking strategy or a two cycle parking strategy is described in co-pending application having a Ser. No. 12/367,778 filed on Feb. 9, 2009, which is incorporated by reference in its entirety. It should be understood that an embodiment as described herein may be utilized with other methods which determine the available parking space between the two objects in addition to the method which determines the intended trajectory for parallel parking the vehicle.

Figure 2:
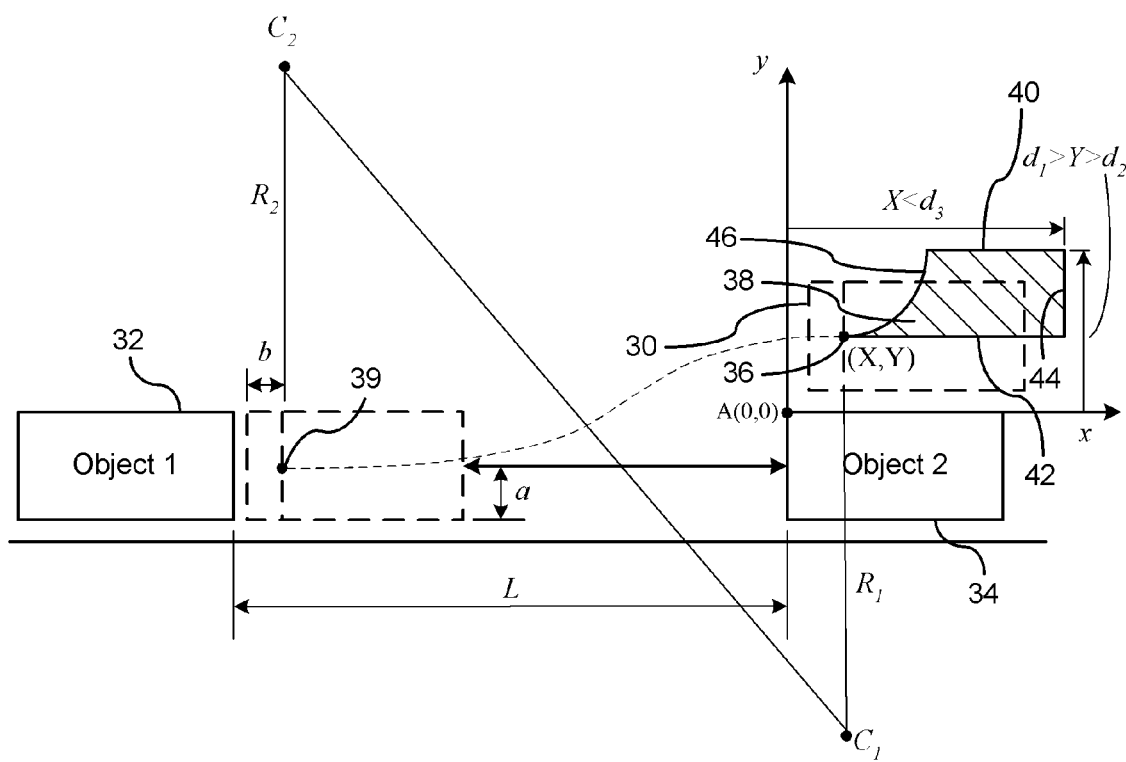
FIG. 2 is a geometric schematic illustrating vehicle path planning for applying a one cycle steering strategy maneuver according to an embodiment.

FIG. 2 is a geometric schematic illustrating vehicle path planning for applying a one cycle parking strategy to park a vehicle 30 in the available parking space. A first object 32 and a second object 34 are shown having a spacing L therebetween. The width of the available parking space is assumed to be a width of the vehicle 30. A coordinate system yAx shown having its origin (0,0) at a rear driver-side corner of the second object 34 is used to identify a position of the vehicle 30 as it maneuvers into the available parking space. A rear axle midpoint 36 of the vehicle 30 is used to identify the position of the vehicle 30 within the yAx coordinate system as it maneuvers into the available parking space. The vehicle utilizes the one cycle parking strategy to generate a planned path of travel as it transitions from a driving lane to the available parking space.

A designated region 38 indicates an area in which the rear axle midpoint 36 of the vehicle 30 must be initially positioned in order to successfully execute the parallel parking maneuver to a final position 39. The designated region 38 has a boundary that is defined by segments. A first segment 40 and a second segment 42 are linear and are parallel to one another. The first segment 40 and the second segment 42 are unequal lengths. A third segment 44 is linear and is perpendicular to both the first segment 40 and the second segment 42. The third segment 44 couples the first segment 40 to the second segment 42 at the intersection of the third and first segments and the third and second segments.

A fourth segment 46 is a curved segment that extends between and couples the first segment 40 and the second segment 42. The fourth segment 46 is determined as a function of the right hand turn radius $R_1$ (i.e., clockwise steering) and the left hand turn radius $R_2$ (counterclockwise steering) to be used for the steering maneuvers of first cycle parking strategy. The formula for determining the fourth segment when vehicle is at an orientation angle of zero is as follows:

$$(X+L-b)^2+(Y+a-R_1-R_2)^2=(R_1+R_2)^2$$

where L is the distance between the first object and the second object, a is half of a vehicle width, b is the distance between the rear axle and the rear bumper of the vehicle, $R_1$ is the turning radius of the clockwise steering maneuver during the parallel parking maneuver, $R_2$ is the turning radius of a counterclockwise steering maneuver during the parallel parking maneuver, and X and Y are the coordinates of a point varying on the fourth segment. The vehicle has an orientation angle $\psi$ with respect to the x-axis. Therefore, if a centerline of the vehicle 47 (i.e., an imaginary line that is perpendicular to the rear axle and extends through the center of the vehicle from the rear to the front of the vehicle shown in FIG. 3) is parallel with the x-axis, then the orientation angle $\psi$ is zero. The term longitudinal used herein refers to the x-axis direction in the yAx coordinate system (i.e., along the centerline of the vehicle) and the term latitudinal used herein refers to the y-direction in the yAx coordinate system (i.e., perpendicular to the centerline of the vehicle).

The first segment 40 is a linear segment that extends parallel to the x-axis at $Y=d_1$ between the intersection with the fourth segment 46 and the intersection with the third segment 44. The second segment 42 is a linear segment that extends parallel to the x-axis at $Y=d_2$ between the intersection with fourth segment 46 and the third segment 44. The third segment 44 is a linear segment that extends parallel to the y-axis at $X=d_3$ between the intersection with the first segment 40 and the intersection with the second segment 42. The values $d_1$ and $d_2$ represent predetermined values for placing a limitation on the latitudinal boundaries of the designated region. Similarly, $d_3$ represents a predetermined value for placing a limitation on the longitudinal boundary of the designated region. The values are determined based on vehicle characteristics including, but not limited to, the vehicle length, width, and steering radius as well as road lane width. The fourth segment 46 is a curved segment which extends between the first segment 40 and the second segment 42. The intersection of the fourth segment 46 with the first segment 40 and the third segment defines the length of the fourth segment 46. As a result, a successful parallel parking maneuver may be executed if the rear axle midpoint 36 of the vehicle 30 is within the designated region 38 when the parallel parking maneuver is initiated. If the vehicle 30 is not within the designation region 38, a driver of the vehicle may be notified and requested to move to the designated area before initiating the parallel parking maneuver.

Figure 3:
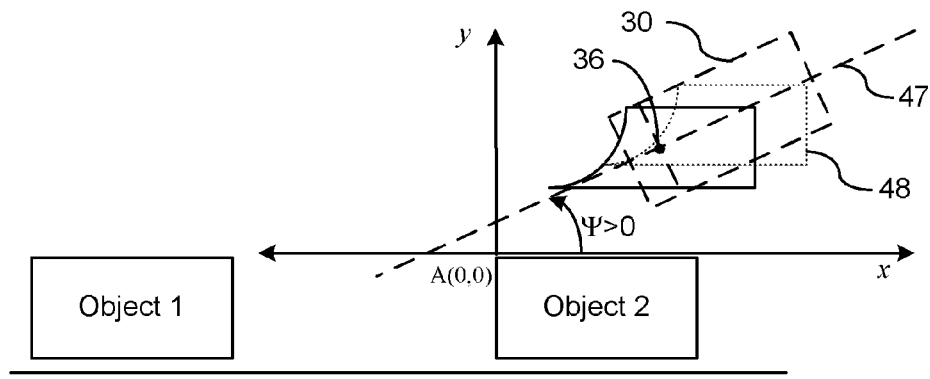
FIGS. 3-5 illustrate diagrammatic views of designated regions for initiating a parallel parking maneuver.

FIG. 3 illustrates a condition when the orientation angle ψ of the vehicle is greater than zero. If the orientation angle ψ is greater than zero, such that the centerline of the vehicle 47 is angled toward the available parking space, then the designated region for initiating the parallel parking maneuver will be offset from the original designated region (i.e., having a zero orientation angle) as shown in FIG. 3. The reconfigured designated region is identified generally by 48. The formula for determining the fourth segment where the orientation angle ψ is positive is represented as follows:

$$(X+L-b-R_2 \sin \psi)^2+(Y+a-R_1-R_2-R_2(1-\cos \psi))^2= (R_1+R_2)^2$$

where L is the distance between the first object and the second object, a is half of a vehicle width, b is a distance between the rear axle and the a rear bumper of the vehicle, $R_1$ is the turning radius of the right hand steering maneuver during the parallel parking maneuver, $R_2$ is the turning radius of the left hand steering maneuver during the parallel parking maneuver, and X and Y are the coordinates of a point varying on the fourth segment, and ψ is the orientation angle relative to the x-axis.

Figure 4:
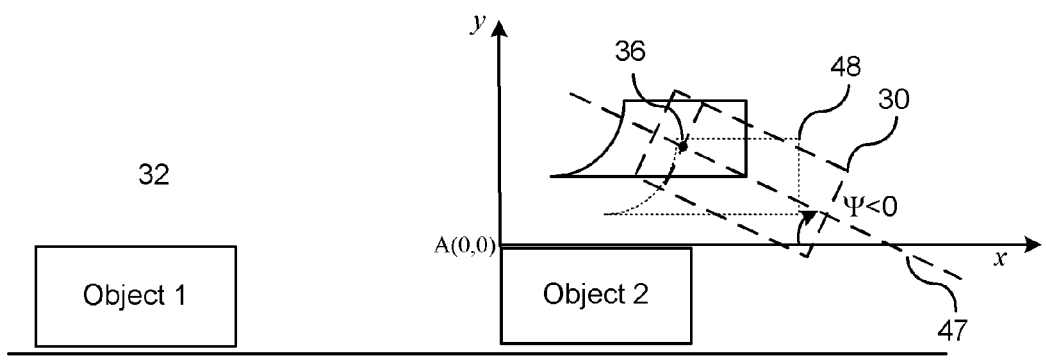

FIG. 4 illustrates a condition when the orientation angle of the vehicle is less than zero. If the orientation angle is less than zero, such that the centerline of the vehicle 47 is angled away from the available parking space, then the designated region will be offset from the from the original designated region (i.e., having the zero orientation angle) as shown in FIG. 4. The formula for determining the fourth segment where the orientation angle is positive is represented as follows:

$$(X+L-b_1+R_2 \sin \psi)^2+(Y+a-R_1-R_2+R_2(1-\cos \psi))^2= (R_1+R_2)^2$$

where L is the distance between the first object and the second object, a is half of a vehicle width, $b_1$ is a distance between the rear axle and the a rear bumper of the vehicle, $R_1$ is the turning radius of the right hand steering maneuver during the parallel parking maneuver, $R_2$ is the turning radius of the left hand steering maneuver during the parallel parking maneuver, X and Y are the coordinates of a point varying on the fourth segment, and ψ is the orientation angle of the vehicle relative to the x-axis.

Figure 5:
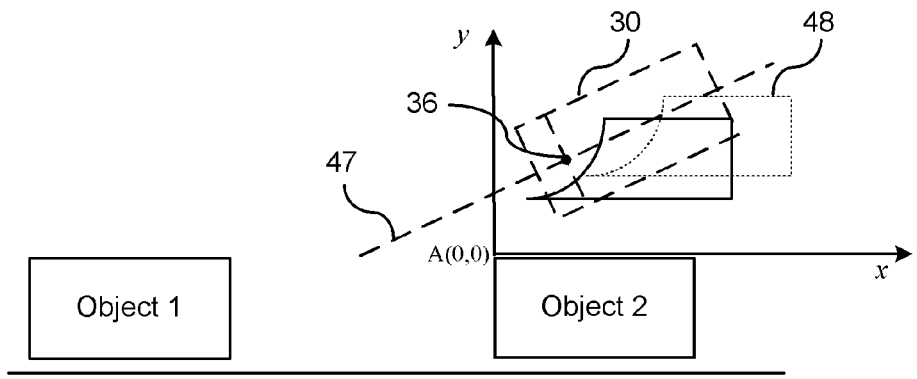

FIG. 5 illustrates a condition where the vehicle is in a position which would not satisfy the conditions for initiating the parallel parking maneuver. As shown in FIG. 5, the rear axle midpoint 36 is located outside of the designated region 48. Therefore, initiating parallel parking from this position is not feasible.

Figure 6:
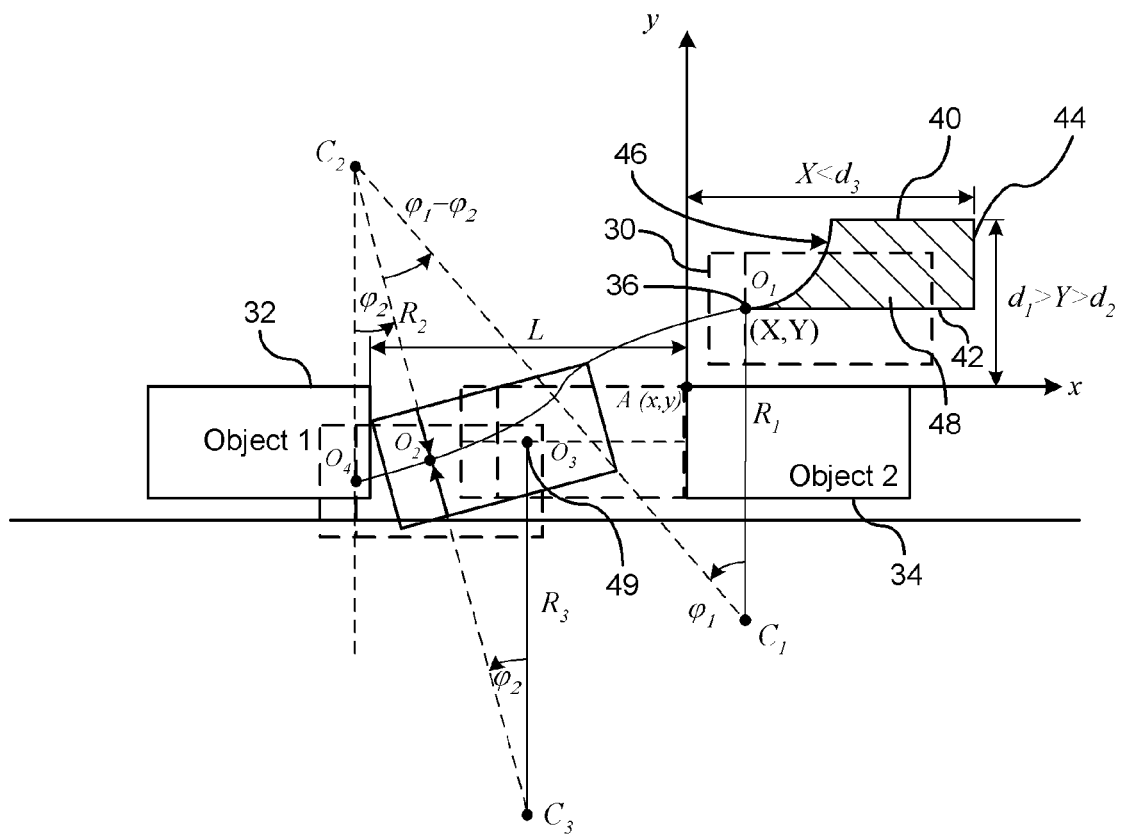
FIG. 6 is a geometric schematic illustrating vehicle path planning for applying a two cycle steering strategy maneuver according to an embodiment.

FIG. 6 is a geometric schematic illustrating vehicle path planning for applying a two cycle parking strategy to park the vehicle 30 in the available parking space. The schematic is similar to that shown in FIG. 2 and will utilize same reference numbers for similar elements. The first object 32 and the second object 34 are shown having a spacing L therebetween. The width of the available parking space is assumed to be a width of the vehicle 30. The coordinate system yAx is shown having its origin (0,0) at the rear driver-side corner of the second object 34 and is used to locate a position of the vehicle 30 as it maneuvers into the available parking space using the two cycle parking strategy. The two cycle parking strategy includes pivoting the steerable wheels in a first direction and then a counter direction (i.e., first steering cycle) while the vehicle is traveling in a reverse direction. Thereafter, a gear change is performed (i.e., change to the drive position) and a steering maneuver for a second steering cycle is performed for maneuvering the vehicle forward to a final park position.

A designated region 48 indicates an area in which the rear axle midpoint 36 of the vehicle 30 must be positioned within to successfully execute the two cycle parking strategy to the final position 49. The designated region 48 includes a boundary having four segments. Segments 40-44 are similar to those described earlier in reference to FIG. 2. The fourth segment 46 is determined as a function of the right hand turn radius $R_1$ (i.e., clockwise turning radius) and the left hand turn radius $R_2$ (counterclockwise turning radius) when the vehicle maneuvers in the reverse direction during the first steering cycle. The formula for determining the fourth segment 46 of the designated region 48 when implementing the two cycle parking strategy and when vehicle is at an orientation angle ψ of zero is as follows:

$$(X_4-X)^2+(Y_4-Y+R_1-R_2)^2=(R_1+R_2)^2$$

where $R_1$ is the turning radius of the clockwise steering maneuver during the in the reverse direction, $R_2$ is the turning radius of a counterclockwise steering maneuver during the first steering cycle, $X_4$ is a longitudinal distance of a projected point from the origin in which the vehicle would be positioned if the vehicle was parked parallel to the x-axis using only the first steering cycle of the two cycle parking strategy while having unbounded space between the first and second objects, and $Y_4$ is a latitudinal distance of a projected point from the origin in which the vehicle would be positioned if the vehicle was parked parallel to the x-axis using only the first steering cycle of the two cycle parking strategy while having unbounded space between the first and second objects, and X and Y are the coordinates of a point varying on the fourth segment.

If the orientation angle ψ of the vehicle is positive, then the designated region will be shifted accordingly. The formula for determining the fourth segment for a two cycle parking strategy where the orientation angle is positive is represented as follows:

$$(X_4-X-R_2 \sin \psi)^2+(Y_4-Y+R_1-R_2(1-\cos \psi))^2=(R_1+R_2)^2$$

where $R_1$ is the turning radius of the clockwise steering maneuver during the in the reverse direction, $R_2$ is the turning radius of a counterclockwise steering maneuver during the first steering cycle, $X_4$ and $Y_4$ are longitudinal and latitudinal values in the yAx coordinate system of a projected point from the origin in which the vehicle would be positioned if the vehicle was parked parallel to the x-axis using only the first steering cycle of the two cycle parking strategy while having unbounded space between the first and second objects, and ψ is the orientation angle of the vehicle relative to the x-axis.

If the orientation angle ψ of the vehicle is negative, then the formula for determining the fourth segment where the orientation angle is negative is represented as follows:

$$(X_4-X+R_2 \sin \psi)^2+(Y_4-Y+R_1+R_2(1-\cos \psi))^2=(R_1+R_2)^2$$

where $R_1$ is the turning radius of the clockwise steering maneuver during the in the reverse direction, $R_2$ is the turning radius of a counterclockwise steering maneuver during the first steering cycle, $X_4$ and $Y_4$ are latitudinal and longitudinal values in the yAx of a projected point from the origin in which the vehicle would be positioned if the vehicle was parked parallel to the x-axis using only the first steering cycle of the two cycle parking strategy while having unbounded space between the first and second objects, X and Y are the coordinates of a point varying on the fourth segment, and ψ is the orientation angle of the vehicle relative to the x-axis.

Figure 7:
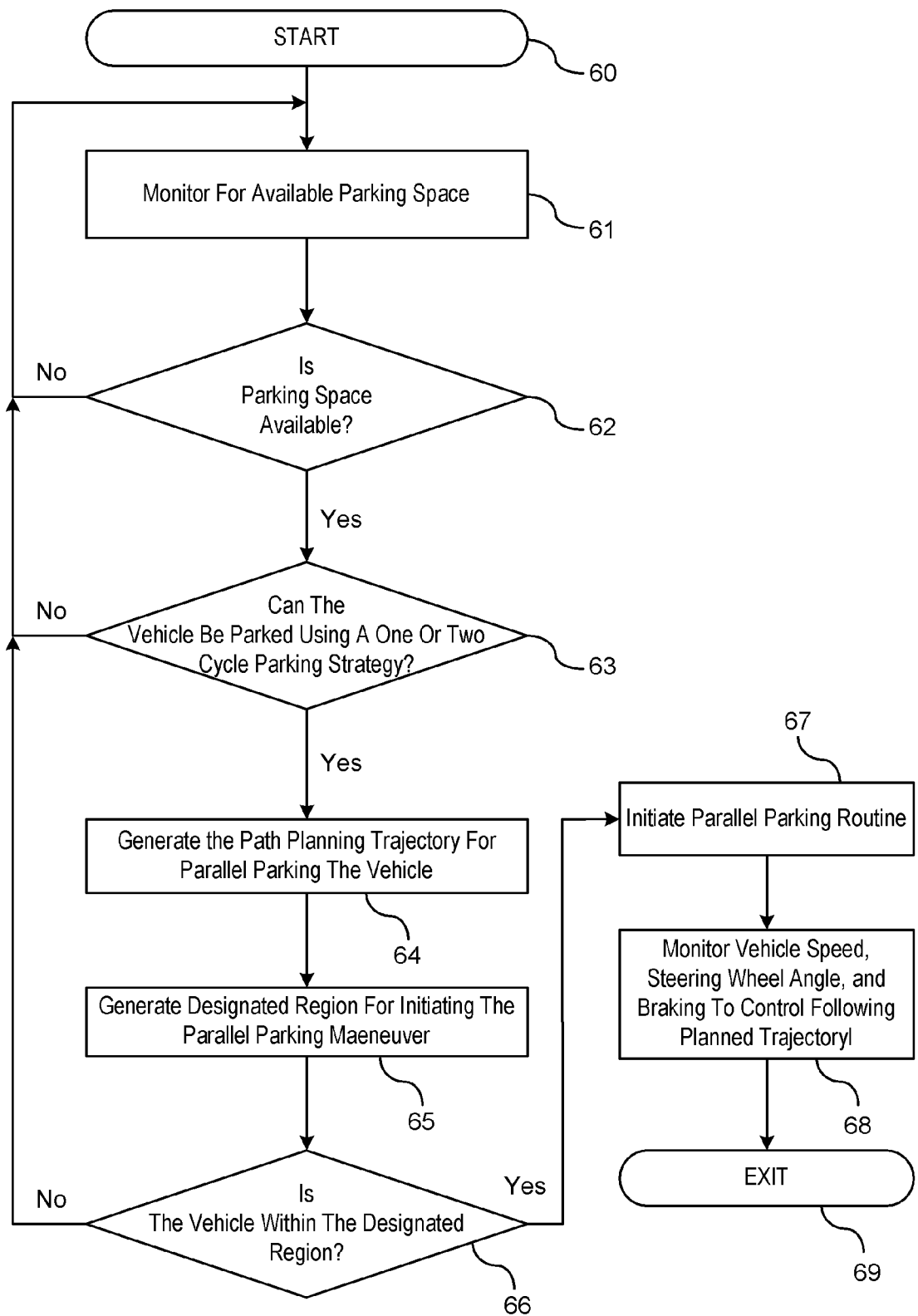
FIG. 7 is a flowchart of a method for executing the automatic parallel parking routine.

FIG. 7 illustrates a flowchart of a method for initiating the parallel parking routine. In step 60, the routine is initiated and the vehicle monitors for an available parking space. The monitoring may be manually actuated by the driver of the vehicle enabling a routine that actuates the sensing devices to monitor for an available parking space. In step 62, target parking space between the first object and the second object is determined.

In step 63, a determination whether a single cycle parking strategy or a two cycle parking strategy can be used to parallel park the vehicle. If it is not feasible to park the vehicle using either a one cycle or two cycle parking strategy based on the available space between the objects, the routine returns to step 61 to continue monitoring for a next available space. Alternatively, the routine may exit and the driver may have to enable the monitoring procedure again. If the determination is made that the distance between the objects is sufficient to parallel park the vehicle using the one or two cycle parking strategy, then the routine proceeds to step 64.

In step 64, a parallel path planning routine is initiated for generating a planned path for parking the vehicle utilizing either the one cycle parking strategy or the two cycle parking strategy.

In step 65, a designated region is generated for initiating the parallel parking maneuver based on whether a one cycle parallel parking strategy is used or whether a two cycle parallel parking strategy is used. The designated region is determined based on parameters of the planned parking trajectory and the orientation of the vehicle while at a rest position prior to initiating the parallel parking routine.

In step 66, a comparison is made with respect to the vehicle location and the feasibility region. The vehicle location is determined as a function of the location of the rear axle midpoint. If the location of the vehicle as determined from the rear axle midpoint is outside of the designated region, then the parallel parking routine is not initiated. A notification may be provided to the driver of the vehicle indicating the infeasibility of not being able to perform the parallel parking routine, or the driver of the vehicle may be requested to move to the designated region, and then a return is made to step 61. If the determination is made that the location of the vehicle is within the designated region, then the routine proceeds to step 67.

In step 67, once feasibility is confirmed, the parallel parking strategy is executed.

In step 68, the steering wheel angle, the vehicle speed, and the vehicle braking are autonomously controlled for parallel parking the vehicle.

In step 69, once the vehicle is parked at its final park position, the routine is exited.

It should be understood that for the embodiments described herein, that the terms clockwise steering maneuver and counterclockwise steering maneuver are designated terms for vehicles that utilize left side steering systems. Without deviating from the scope of the invention, it is understood that the invention is meant to include those vehicle systems that use right side steering system and that the steering maneuver designations (e.g., clockwise and counterclockwise) would be reversed under such circumstances.

It should also be understood that the determination of the designation region for initiating parallel parking can be used with semi-autonomous parallel parking routines where some input control is required by the driver or for manual parallel parking routines where the driver is provided a planned parking path and must follow the planned route accordingly. In each of the instances, the designated region may be used to notify the driver whether the planned parking path as determined may be initiated.

While certain embodiments of the present invention have been described in detail, those familiar with the art to which this invention relates will recognize various alternative designs and embodiments for practicing the invention as defined by the following claims.

What is claimed is:

1. A method for initiating a parking maneuver for parallel parking a vehicle between a first object and a second object, the method comprising the steps of:
   measuring a target parking space;
   determining whether the measured target parking space is sufficient to allow an autonomous parallel parking maneuver;
   if sufficient, then determining a region of feasible starting locations to successfully perform the parallel parking maneuver between the first object and the second object, wherein the respective region for initiating the parallel parking maneuver is bound by a first linear segment, a second linear segment, a third linear segment, and a non-linear segment, wherein the first linear segment is parallel to the second linear segment, wherein the third linear segment is perpendicular to and connecting the first and second linear segments, and wherein the non-linear segment connects the first and second linear segments;
   determining a position of a midpoint of a rear axle of the vehicle in relation to the designated region;
   determining whether the midpoint of the rear axle is within the designated region; and
   signaling to a driver of the vehicle whether an instantaneous location of the midpoint of the rear axle is a feasible starting location to initiate the parallel parking maneuver.

2. The method of claim 1 wherein a position of the vehicle is determined based on the position of the rear axle midpoint of the vehicle.

3. The method of claim 1 further comprising the step of determining an orientation angle of the vehicle relative to an x-axis having an origin originating at a rear driver-side corner of the second object, wherein the step of determining the orientation angle includes determining whether the orientation angle of the vehicle is zero, whether the orientation angle is a positive orientation, or whether the orientation angle is a negative orientation.

4. The method of claim 3 wherein the step of determining a feasibility of successfully performing the parallel parking maneuver based on the available parking space includes determining whether the vehicle can be parallel parked utilizing a one cycle parking strategy or a two cycle parking strategy, wherein the one cycle parking strategy includes applying a first steering maneuver and then a second steering maneuver while the vehicle travels in a reverse direction until the vehicle reaches a final parking position, wherein the second steering maneuver is a counter direction to the first steering maneuver, and wherein the two cycle parking strategy includes applying the first steering maneuver and then the second steering maneuver that is counter to the first steering maneuver while the vehicle travels in a reverse direction and applying a third steering maneuver when the vehicle travels in a forward direction until the vehicle reaches a final park position.

5. The method of claim 4 wherein in response to the determination that the vehicle can be parked using a one cycle parking strategy and the vehicle having a zero orientation angle, the fourth nonlinear segment is determined by the following formula:

$$(X+L-b)^2+(Y+a-R_1-R_2)^2=(R_1+R_2)^2$$

where L is the distance between the first object and the second object, a is half of a vehicle width, $b_1$ is a distance between the rear axle and the a rear bumper of the vehicle, $R_1$ is the turning radius of the first steering maneuver during the parallel parking maneuver, and $R_2$ is the turning radius of a second steering maneuver during the parallel parking maneuver, and X and Y are the coordinates of a point varying on the non-linear segment.

6. The method of claim 4 wherein in response to the determination that the vehicle can be parked using a one cycle parking strategy and the vehicle having a positive orientation angle, the fourth nonlinear segment is determined by the following formula:

$$(X+L-b-R_2 \sin \psi)^2+(Y+a-R_1-R_2-R_2(1-\cos \psi))^2=(R_1+R_2)^2$$

where L is the distance between the first object and the second object, a is half of a vehicle width, b is a distance between the rear axle and the a rear bumper of the vehicle, $R_1$ is the turning radius of the first steering maneuver during the parallel parking maneuver, and $R_2$ is the turning radius of the second steering maneuver during the parallel parking maneuver, and X and Y are the coordinates of a point varying on the non-linear segment, and v is the orientation angle relative to a X axis.

7. The method of claim 4 wherein in response to the determination that the vehicle can be parked using a one cycle parking strategy and the vehicle having a negative orientation angle, the fourth nonlinear segment is determined by the following formula:

$$(X+L-b+R_2 \sin \psi)^2+(Y+a-R_1-R_2+R_2(1-\cos \psi))^2(R_1+R_2)^2$$

where L is the distance between the first object and the second object, a is half of a vehicle width, b is a distance between the rear axle and the a rear bumper of the vehicle, $R_1$ is the turning radius of the first steering maneuver during the parallel parking maneuver, and $R_2$ is the turning radius of the second maneuver during the parallel parking maneuver, and X and Y are the coordinates of a point varying on the non-linear segment, and $\psi$ is the orientation angle of the vehicle relative to a X axis.

8. The method of claim 4 wherein in response to the determination that the vehicle can be parked using a two cycle parking strategy and the vehicle having a zero orientation angle, the fourth nonlinear segment is determined by the following formula:

$$(X_4-X)^2+(Y_4-Y+R_1-R_2)^2=(R_1+R_2)^2$$

where $R_1$ is the turning radius of a first steering maneuver during a first cycle of two cycle parking strategy, and $R_2$ is the turning radius of a second steering maneuver during the first cycle of the parallel parking strategy, $X_4$ is a longitudinal distance of a projected point from the origin in which the vehicle would be positioned if the vehicle was parked parallel to the x-axis while having unbounded space between the first and second objects, and $Y_4$ is a latitudinal distance of a projected point from the origin in which the vehicle would be positioned if the vehicle was parked parallel to the x-axis using only the first steering cycle of the two cycle parking strategy while having unbounded space between the first and second objects, and X and Y are the coordinates of a point varying on the non-linear segment.

9. The method of claim 4 wherein in response to the determination that the vehicle can be parked using a two cycle parking strategy and the vehicle having a positive orientation angle, the fourth nonlinear segment is determined by the following formula:

$$(X_4-X-R_2 \sin \psi)^2+(Y_4-Y+R_1-R_2(1-\cos \psi))^2=(R_1+R_2)^2$$

where $R_1$ is the turning radius of a first steering maneuver during a first cycle of two cycle parking strategy, and $R_2$ is the turning radius of a second steering maneuver during the first cycle of the parallel parking strategy, $X_4$ and $Y_4$ are longitudinal and latitudinal values in the yAx coordinate system of a projected point from the origin in which the vehicle would be positioned if the vehicle was parked parallel to the x-axis using only the first steering cycle of the two cycle parking strategy while having unbounded space between the first and second objects, X and Y are the coordinates of a point varying on the non-linear segment, and $\psi$ is the orientation angle of the vehicle relative to the X axis.

10. The method of claim 4 wherein in response to the determination that the vehicle can be parked using a two cycle parking strategy and the vehicle having a negative orientation angle, the fourth nonlinear segment is determined by the following formula:

$$(X_4-X+R_2 \sin \psi)^2+(Y_4-Y+R_1+R_2(1-\cos \psi))^2=(R_1+R_2)^2$$

where $R_1$ is the turning radius of a first steering maneuver during a first cycle of two cycle parking strategy, and $R_2$ is the turning radius of a second steering maneuver during the first cycle of the parallel parking strategy, $X_4$ and $Y_4$ are longitudinal and latitudinal values in the yAx coordinate system of a projected point from the origin in which the vehicle would be positioned if the vehicle was parked parallel to the x-axis using only the first steering cycle of the two cycle parking strategy while having unbounded space between the first and second objects, X and Y are the coordinates of a point varying on the non-linear segment, and $\psi$ is the orientation angle of the vehicle relative to the X axis.

11. A method for initiating a parking maneuver for parallel parking a vehicle between a first object and a second object, the method comprising the steps of:
identifying an available parking space for parking the vehicle between the first object and the second object;
determining whether the available parking space is sufficient to successfully perform a parallel parking maneuver in response to a width of the vehicle, a length of the available parking space, a rear axle midpoint-to-bumper length, and vehicle turning radius;
determining a designated region to initiate a successful parallel parking maneuver, wherein the respective region for initiating the parallel parking maneuver is bound by a first linear segment, a second linear segment, a third linear segment, and a non-linear segment, wherein the first linear segment is parallel to the second linear segment, wherein the third linear segment is perpendicular to and connecting the first and second linear segments, and wherein the non-linear segment connects the first and second linear segments;
determining a position of the midpoint of the rear axle of the vehicle in relation to the designated region;
determining whether the midpoint of the rear axle is within the designated region; and
performing a parallel parking maneuver for parking the vehicle in the available parking space in response to the midpoint of the rear axle being within the respective region.

12. An autonomous parking system for parallel parking a vehicle between a first object and a second object, the autonomous parking system identifying a feasible region in a road adjacent the second object for initiating an autonomous parallel parking maneuver, the system comprising:

a sensing device for detecting objects proximate to the driven vehicle, the sensing device providing signals configured for determining a space between the first object and the second object; and a controller for receiving the signals identifying the space between the first object and the second object, the controller determining a whether the vehicle can be autonomously parked utilizing a one cycle parking strategy or a two cycle parking strategy;

wherein the controller determines the respective region in relation to the second object to initiate an autonomous parallel parking maneuver between the first and second objects, wherein the respective region is bound by a first linear segment, a second linear segment, a third linear segment, and a non-linear segment, wherein the first linear segment is parallel to the second linear segment, wherein the third linear segment is perpendicular to and connecting the first and second linear segments, and wherein the non-linear segment is a connects the first and second linear segments, the controller further identifying whether the vehicle is within the respective region, and wherein the controller actuates a command to initiate the autonomous parallel parking maneuver in response to the vehicle being within the respective region.

13. The system of claim 12 wherein the controller determines an orientation angle of the vehicle relative an x-axis having an origin originating at a rear left side corner of the second object, wherein determining the orientation angle includes determining whether the orientation angle of the vehicle is zero, or whether the orientation angle is a positive orientation, or whether the orientation angle is a negative orientation.

14. The system of claim 12 wherein the controller determines whether the vehicle can be autonomously parallel parked using a one cycle parking strategy, wherein in response to the controller determining that the vehicle can be parallel parked using a one cycle parking strategy, then for an orientation of the vehicle being zero, the fourth nonlinear segment is determined by the following formula:

$$(X+L-b_1)^2+(Y+a-R_1-R_2)^2=(R_1+R_2)^2$$

where L is the distance between the first object and the second object, a is half of a vehicle width, b is a distance between the rear axle and the a rear bumper of the vehicle, $R_1$ is the turning radius of the first steering maneuver during the parallel parking maneuver, and $R_2$ is the turning radius of a second steering maneuver during the parallel parking maneuver, and X and Y are the coordinates of a point varying on the non-linear segment.

15. The system of claim 12 wherein the controller determines whether the vehicle can be autonomously parallel parked using a one cycle parking strategy, wherein in response to the controller determining that the vehicle can be parallel parked using the one cycle parking strategy, then for an orientation of the vehicle having a positive orientation, the fourth nonlinear segment is determined by the following formula:

$$(X+L-b-R_2 \sin \psi)^2+(Y+a-R_1-R_2-R_2(1-\cos \psi))=(R_1+R_2)^2$$

where L is the distance between the first object and the second object, a is half of a vehicle width, b is a distance between the rear axle and the a rear bumper of the vehicle, $R_1$ is the turning radius of the first steering maneuver during the parallel parking maneuver, and $R_2$ is the turning radius of the second steering maneuver during the parallel parking maneuver, and X and Y are the coordinates of a point varying on the non-linear segment, and $\psi$ is the orientation angle relative to a X axis.

16. The system of claim 12 wherein the controller determines whether the vehicle can be autonomously parallel parked using a one cycle parking strategy, wherein in response to the controller determining that the vehicle can be parallel parked using the one cycle parking strategy, then for an orientation of the vehicle having a negative orientation, the fourth nonlinear segment is determined by the following formula:

$$(X+L-b+R_2 \sin \psi)^2+(Y+a-R_1-R_2+R_2(1-\cos \psi))=(R_1+R_2)^2$$

where L is the distance between the first object and the second object, a is half of a vehicle width, b is a distance between the rear axle and the a rear bumper of the vehicle, $R_1$ is the turning radius of the first steering maneuver during the parallel parking maneuver, and $R_2$ is the turning radius of the second steering maneuver during the parallel parking maneuver, and X and Y are the coordinates of a point varying on the non-linear segment, and $\psi$ is the orientation angle of the vehicle relative to the X axis.

17. The system of claim 12 wherein the controller determines whether the vehicle can be autonomously parallel parked using a two cycle parking strategy, wherein in response to the controller determining that the vehicle can be parallel parked using the two cycle parking strategy, then for an orientation of the vehicle being zero, the fourth nonlinear segment is determined by the following formula:

$$(X_4-X)^2+(Y_2-Y+R_1-R_2)^2=(R_1+R_2)^2$$

where $R_1$ is the turning radius of a first steering maneuver during a first cycle of two cycle parking strategy, and $R_2$ is the turning radius of a second steering maneuver during the first cycle of the parallel parking strategy, while having unbounded space between the first and second objects, $X_4$ is a longitudinal distance of a projection point from the origin in which the vehicle would be positioned if the vehicle was parked parallel to the x-axis using only the respective steering maneuvers in the reverse direction, and $Y_4$ is a latitudinal distance of a projected point from the origin in which the vehicle would be positioned if the vehicle was parked parallel to the x-axis using only the first steering cycle of the two cycle parking strategy while having unbounded space between the first and second objects and X and Y are the coordinates of a point varying on the non-linear segment.

18. The system of claim 12 wherein the controller determines whether the vehicle can be autonomously parallel parked using a two cycle parking maneuver, wherein in response to the controller determining that the vehicle can be parallel parked using the two cycle parking maneuver, then for an orientation of the vehicle having a positive orientation, the fourth nonlinear segment is determined by the following formula:

$$(X_4-X-R_2 \sin \psi)^2+(Y_2-Y+R_1-R_2(1-\cos \psi))^2=(R_1+R_2)^2$$

where $R_1$ is the turning radius of a first steering maneuver during a first cycle of two cycle parking strategy, and $R_2$ is the turning radius of a second steering maneuver during the first cycle of the parallel parking strategy, $X_4$ and $Y_4$ are longitudinal and latitudinal values in the yAx coordinate system of a projected point from the origin in which the vehicle would be positioned if the vehicle was parked parallel to the x-axis using only the first steering cycle of the two cycle parking strategy while having unbounded space between the first and second objects, X and Y are the coordinates of a point varying on the non-linear segment, and $\psi$ is the orientation angle of the vehicle relative to the X axis.

19. The system of claim 12 wherein the controller determines whether the vehicle can be autonomously parallel parked using a two cycle parking strategy, wherein in response to the controller determining that the vehicle can be parallel parked using the two cycle parking strategy, then for an orientation of the vehicle having a negative orientation, the fourth nonlinear segment is determined by the following formula:

$$(X_4-X_1+R_2 \sin \psi)^2+(Y_2-Y_1+R_1+R_2(1-\cos \psi))^2=(R_1+R_2)^2$$

where $R_1$ is the turning radius of a first steering maneuver during a first cycle of two cycle parking strategy, and $R_2$ is the turning radius of a second steering maneuver during the first cycle of the parallel parking strategy, $X_4$ and $Y_4$ longitudinal and latitudinal values in the yAx coordinate system of a projected point from the origin in which the vehicle would be positioned if the vehicle was parked parallel to the x-axis using only the first steering cycle of the two cycle parking strategy while having unbounded space between the first and second objects, X and Y are the coordinates of a point varying on the non-linear segment and $\psi$ is the orientation angle of the vehicle relative to the X axis.

* * * * *